UNITED STATES PATENT OFFICE.

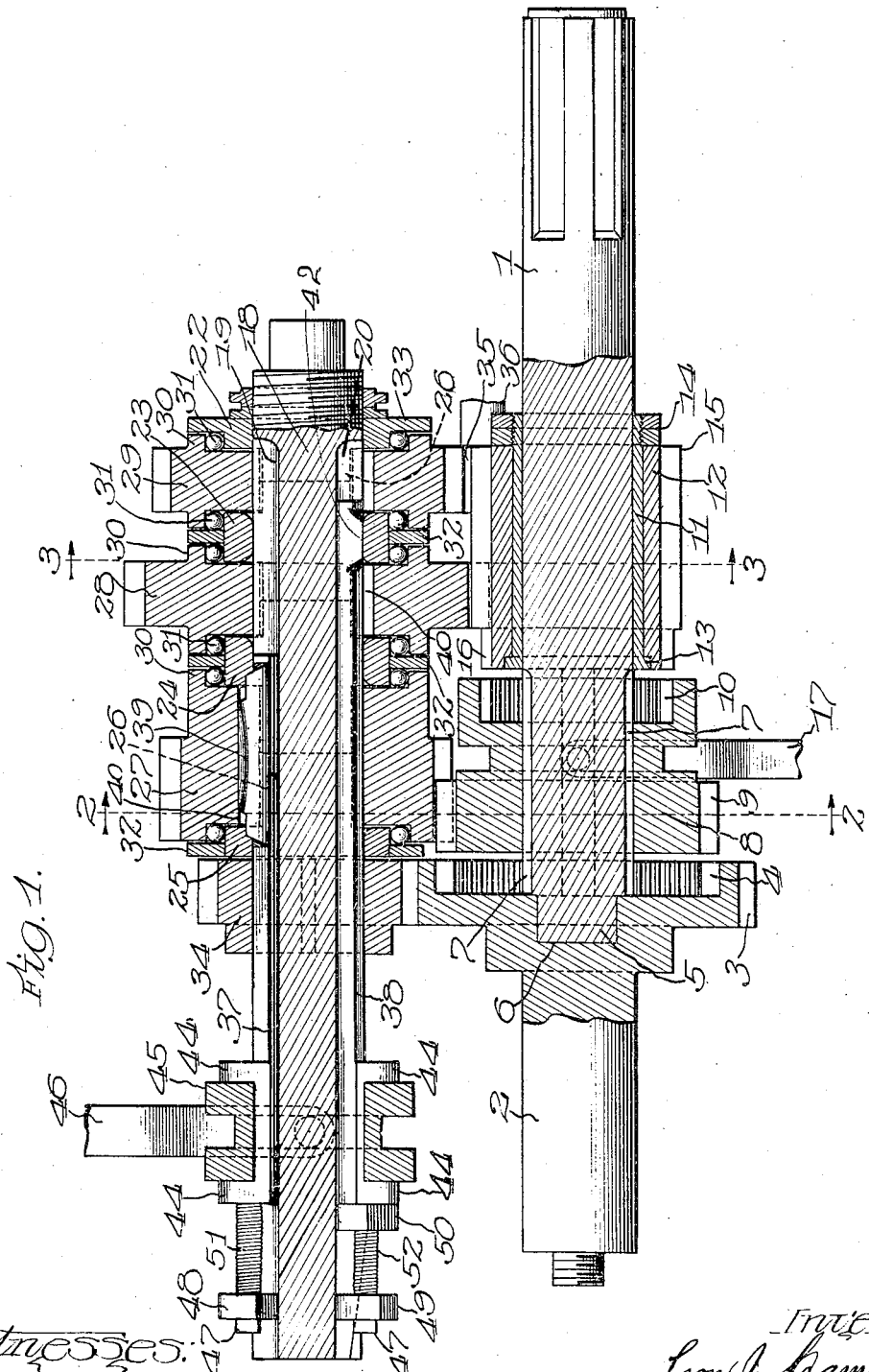

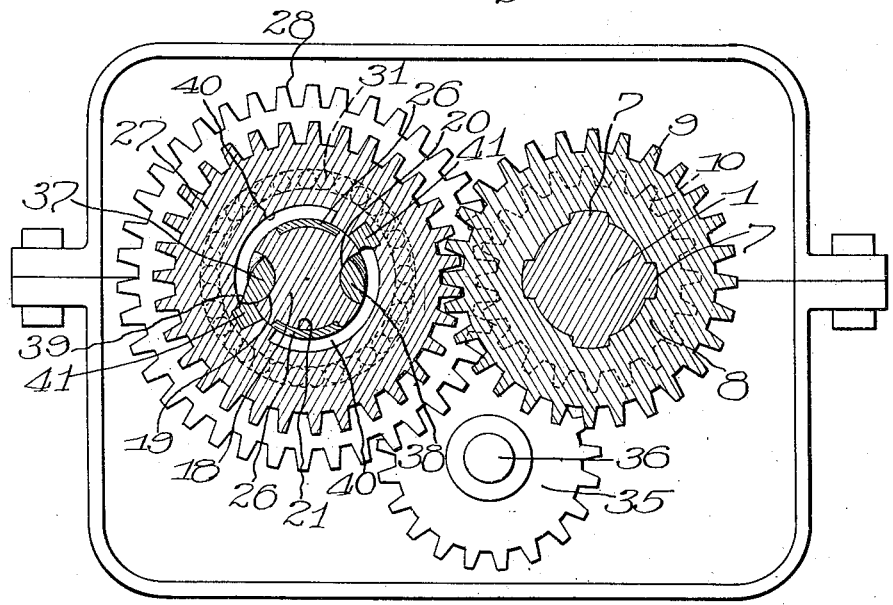
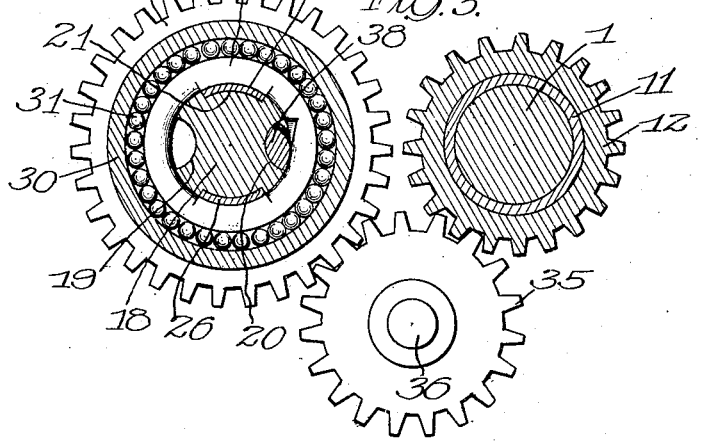

LEON J. CAMPBELL, OF CHICAGO, ILLINOIS, ASSIGNOR TO JAMES T. HEALY, TRUSTEE, OF CHICAGO, ILLINOIS.

VARIABLE-SPEED TRANSMISSION MECHANISM.

1,023,811.  Specification of Letters Patent.  Patented Apr. 23, 1912.

Application filed June 17, 1911. Serial No. 633,699.

*To all whom it may concern:*

Be it known that I, LEON J. CAMPBELL, a citizen of the United States, and residing at Chicago, in the county of Cook and State of Illinois, have invented a new and useful Improvement in Variable-Speed Transmission Mechanism, of which the following is a complete specification.

The main objects of this invention are to provide an improved variable speed transmission mechanism; to provide a variable speed transmission mechanism in which high speed is obtained by direct connection of the driven shaft with the motor shaft; to provide a variable speed transmission mechanism adapted to run from one speed to another with but slight noise and jar on the mechanism; to provide a variable speed transmission mechanism in which the speeds may be changed with great rapidity; and to provide a very strong and durable construction adapted for high speed motor cars, though capable of being used for many other purposes.

A specific embodiment of the invention is illustrated in the accompanying drawings, in which:

Figure 1 is a longitudinal section of a variable speed transmission mechanism embodied in this invention. Fig. 2 is a section taken on line 2—2 of Fig. 1. Fig. 3 is a section on line 3—3 of Fig. 1. Fig. 4 is an outer face view of one of the keys for locking the transmission gears to the transmission shaft.

The construction herein shown is an improvement on the construction shown in my copending application for patent on speed transmissions, filed Jan. 23, 1911, Serial No. 604,060.

In the present construction the drive or motor shaft 1 is in axial alinement with the driven shaft 2 from which the speed or power is transmitted to the vehicle axle or any other device with which the speed transmission mechanism may be used. On the end of the shaft 2 adjacent to the motor shaft 1 is rigidly secured or integrally formed a gear 3 having external teeth, and which is recessed or cup shaped on its face adjacent to the shaft 1 and is provided therein with an internal gear 4.

The extreme inner end 5 of the shaft 1 is reduced in size and has a bearing in a suitable seat 6 in the face of the gear 3. The shaft 1, near its end 5, is provided with keys or feathers 7 extending longitudinally of the shaft and which are preferably formed integrally therewith. Slidably mounted on the keyed portion of the shaft 1 is the double drive gear 8, which, on the end adjacent to the internal gear 4, is provided with the same number of external teeth 9 as there are teeth in the internal gear 4. Said teeth 9 are adapted, when the double gear is in one position, to mesh or telescope with the gear 4 and drive the driven shaft 2 at the same speed as the motor shaft 1, thereby providing the high speed of the speed transmission mechanism. Since all of the teeth 9 mesh with all of the teeth of the gear 4, it is evident that when changing from a lower speed to high speed the shock will be distributed evenly over the gears 8 and 4 and the danger of stripping the teeth will be entirely avoided. Furthermore the telescoping nature of the gears renders it less difficult to make the connection. The other end of the double gear 8 is cup shaped and is provided with an internal gear 10.

Rigidly secured on the shaft 1, adjacent to the keyed portion, is a bushing 11 of brass or other suitable material on which is journaled an elongated pinion 12. The pinion 12 may be held from longitudinal movement on the bushing in any desired manner, but, as shown, the bushing is provided on its inner end with a flange 13 against which a corresponding shoulder in the pinion abuts to hold the pinion from longitudinal movement in one direction. On the outer end of the bushing are the nuts 14 which hold the pinion from movement in the opposite direction. The teeth 15 of the pinion 12 are reduced in size at their inner ends 16 to permit the internal gear 10 to be moved onto or telescope with the same and thereby lock the pinion to the shaft 1. The double gear 8 is provided with a yoke 17 by means of which it may be shifted into mesh with the gear 4 or the pinion 12, or held at a neutral point intermediate said gear and pinion, as shown in Fig. 1. The gears 8 and 4 and the ends 16 of the teeth of the pinion 12 form in effect a clutch whereby either the shaft 2 or the pinion 12 may be locked to the shaft 1.

The transmission shaft 18 extends parallel to the shafts 1 and 2 and is provided with oppositely disposed, longitudinal key seats 19 and 20 which are formed in the arc of a circle. Between the key seats the shaft 18 is milled out longitudinally of the shaft to provide grooves 21, shown in Figs. 2 and 3. Bearing collars 22, 23, 24, and 25 are mounted on the shaft and are provided with laterally extending flanges or webs 26 which seat in the grooves 21 and prevent rotation of the collars on the shaft.

Journaled on the bearing collars are the transmission gears 27, 28, and 29, which afford the second speed, low speed, and reverse drive, respectively. Each of said gears is provided with laterally extending, annular flanges 30 which are concentric with the axes of the gears and overlap the bearing collars. The internal diameters of said flanges are greater than the external diameters of the collars, thereby providing between the same and said collars ball races for the bearing balls 31, on which the gears run. Mounted on the collars 23, 24 and 25, at the ends of the flanges 30, are the washers 32 adapted to hold the balls in the races, and the collar 22 is provided with a flange 33 adapted to hold the balls at the outer end of the gear 29 in place. From the foregoing it will be understood that the gears 27, 28 and 29 have their bearing on the bearing collars and not on the transmission shaft 18, thereby relieving the shaft of all wear. Should the bearing collars or gears wear sufficiently to cause rattle they may be slipped off from the shaft and replaced by new ones.

Rigidly secured on the transmission shaft 18, adjacent to the gear 27, is the fixed transmission gear 34 which meshes with the gear 3 on the shaft 2. The gear 27 is always in mesh with the gear teeth 9 of the double gear 8, and the gear 28 meshes with the pinion 12. An idler pinion 35 is journaled on a stud shaft 36 and meshes with the pinion 12 and the reverse gear 29.

Locking keys 37 and 38 are slidably and rockably mounted in the key seats 19 and 20. The locking keys and the means for operating the same are of the same construction and operation as those in my copending application above referred to, and therefore it will not be necessary to fully describe the details of the same since no claims in this application are based thereon. The key 37 is provided on its inner end with a locking lug 39 adapted to be rocked up into the recesses 40 in the gear 27 and abut against abutments 41 in said gear to lock the gear to the shaft. The key 38 has two locking lugs 42 which are oppositely disposed on its inner end and are adapted to be rocked into the recesses 40 in the gears 28 and 29. Two locking lugs 42 are required on the key for the reason that that key rocks in one direction to lock the gear 28 to the shaft, and in the opposite direction to lock the gear 29 to the shaft. The ends of the locking lugs 39 and 42 are provided with beveled shoulders 43 which are adapted to engage beneath the beveled edges of the bearing rings when the keys are being moved out of locking position and thereby rock the keys to bring the lugs out of locking position. Near the outer ends of the keys are lugs 44 between which is mounted a grooved collar 45 to which is connected a forked lever 46 by means of which the keys are moved longitudinally. On the outer ends of the keys are spindles 47, on which are collars 48, 49 and 50, and springs 51 and 52 adapted to rock the keys into locking position, as in my copending application above referred to.

The operation of the construction shown is as follows: When the parts are in the position shown in Fig. 1 and the motor shaft 1 is in operation, the external gear 9 of the double gear 8 is rotating the transmission shaft 18 by means of the gear 27 which is locked to the shaft 18 by means of the key 37. The fixed gear 34 which meshes with the gear 3 drives the shaft 2 at a less speed than that of the motor shaft 1. This provides the second speed. When it is desired to drive the shaft 2 at high speed, or that of the motor shaft, the keys 37 and 38 are moved to the right sufficiently to throw the lug 39 out of the recess 40 but not sufficiently to move the lug 42 into locking position in the gear 29. In that position both keys are neutral, that is their locking lugs are turned down into the key seats, and the gears 27, 28 and 29 are all free to rotate on the shaft 18. The double gear 8 is then shifted to the left to bring the teeth 9 into mesh with the internal gear 4, thereby directly connecting the driven shaft 2 to the motor shaft 1. The external gear 9 is always in mesh with the transmission gear 27, but when the key 37 is out of locking position the gear 27 simply runs idle on the shaft 18. When it is desired to run at low speed the double drive gear 8 is shifted to bring the internal gear 10 into mesh with the teeth 16 of the pinion 12, thereby locking the pinion to the shaft 1, and the keys are shifted to bring the locking lug of the key 38 into locking position in the gear 28. When it is desired to reverse the movement of the shaft 2, the key 38 is shifted to bring its lug into locking position in the gear 29.

While I have shown and described but one specific embodiment of the invention it will be understood that many details of the construction shown may be altered or omitted without departing from the scope of the claims.

I claim:

1. A variable speed transmission mechanism, comprising a motor shaft, a driven shaft in axial alinement with the motor shaft, a gear rigidly secured on the driven shaft, a gear slidably mounted on the motor shaft and adapted to telescope with the gear on the driven shaft, an internal gear rigidly connected with the slide gear, a pinion loosely mounted on the motor shaft and adapted to be engaged by the internal gear, and mechanism operated by said pinion adapted to drive the driven shaft when the internal gear is in mesh with said pinion.

2. A variable speed transmission mechanism, comprising axially alined drive and driven shafts, an elongated pinion loosely mounted on the drive shaft having a clutch member on one end thereof, a gear slidably mounted on the drive shaft having a clutch member adapted to engage the clutch member on the pinion, a fixed gear on the driven shaft having external and internal teeth, the latter being adapted to be engaged by the slide gear, a transmission shaft, loose gears on the transmission shaft in mesh with said pinion, a loose gear on the transmission shaft in mesh with the slide gear, a fixed gear on the transmission shaft in mesh with the external teeth of the gear on the driven shaft, and means for locking the loose gears to the transmission shaft.

3. A variable speed transmission mechanism, comprising a motor shaft, a driven shaft in axial alinement with the motor shaft, a transmission shaft parallel with the motor shaft, permanently meshing loose gears on the motor and transmission shafts, permanently meshing fixed gears on the driven and transmission shafts, means for locking the loose gears on the transmission shaft to said shaft, and a clutch on the motor shaft adapted when in one position to engage the loose gear on the motor shaft and when in another position to engage the gear on the driven shaft.

4. A variable speed transmission mechanism, comprising a motor shaft, a driven shaft in axial alinement with the motor shaft, a transmission shaft parallel with the motor shaft and driven shaft, intermeshing gears on the motor and transmission shafts and on the driven and transmission shafts, a loose gear on the transmission shaft, and means on the motor shaft permanently in mesh with said loose gear and adapted when shifted in one direction to drive the driven shaft directly from the motor shaft and when shifted in the opposite direction to drive the driven shaft through the intermediary of the transmission shaft.

5. A variable speed transmission mechanism, comprising a motor shaft and a driven shaft in axial alinement, a transmission shaft parallel with said shafts, fixed intermeshing gears on the driven shaft and transmission shaft, loose gears on the transmission shaft, means adapted to lock any of said loose gears to the transmission shaft, a loose pinion on the motor shaft in mesh with part of said loose gears and means on the motor shaft adapted when in one position to engage the other loose gear and the fixed gear on the driven shaft, and when in another position to remain connected with said loose gear and be connected with said pinion.

6. A variable speed transmission mechanism, comprising a motor shaft, a driven shaft in axial alinement therewith, a transmission shaft parallel with the motor and driven shafts, intermeshing fixed gears on the transmission and driven shafts, intermeshing loose gears on the transmission and motor shafts, a loose gear on the transmission shaft, a slidable, non-rotative gear on the motor shaft, permanently in mesh with the last named loose gear, and clutch means on the slidable gear adapted when in one position to engage the fixed gear on the driven shaft, and when in another position to lock the loose gear on the motor shaft to the shaft.

7. A variable speed transmission mechanism, comprising axially alined motor and driven shafts, a transmission shaft, intermeshing fixed gears on the transmission shaft and driven shaft, intermeshing loose gears on the transmission and motor shafts, and a clutch adapted when in one position to coact with the fixed gear on the driven shaft to drive the driven shaft directly from the motor shaft and when in another position to coact with the loose gear on the motor shaft to drive the driven shaft through the intermediary of the transmission shaft.

8. A variable speed transmission mechanism, comprising a motor shaft and a driven shaft, coacting direct drive means adapted to drive the driven shaft at high speed directly from the motor shaft, a transmission shaft, and means thereon permanently engaging the parts of the drive means, and adapted when said parts are in another position to drive the driven shaft at another speed.

9. A variable speed transmission mechanism, comprising a motor shaft, a driven shaft in axial alinement therewith, a transmission shaft parallel with said shafts, a combined external and internal gear rigidly fixed on the driven shaft, a double drive gear slidably mounted on the motor shaft and adapted to mesh at one end with the internal gear, a loose pinion on the drive shaft adapted to be engaged by the opposite end of the double gear, loose gears on the transmission shaft meshing with said pinion, a loose gear on the transmission shaft meshing with the double gear, a fixed gear on the transmission shaft meshing with the external gear on the driven shaft, and means for selectively locking the loose gears to the transmission shaft.

10. A variable speed transmission mechanism, comprising axially alined motor and driven shafts, an internal and an external gear on the driven shaft, a transmission shaft, a fixed gear on the transmission shaft meshing with said external gear, loose gears on the transmission shaft, means for selectively locking the loose gears to the transmission shaft, a pinion loosely mounted on the motor shaft and meshing with part of said loose gears, and a double gear slidably mounted on the motor shaft and having an external gear at one end in mesh with one of the loose gears on the transmission shaft, and adapted to be thrown into mesh with the internal gear on the driven shaft, and having an internal gear at its other end adapted to be thrown into mesh with said pinion.

In witness whereof I have hereunto subscribed my name in the presence of two witnesses.

LEON J. CAMPBELL.

Witnesses:
JAS. T. HEALY,
W. W. WITHENBURY.